April 3, 1934.  H. J. WALLACE  1,953,665
PIPE CONNECTION
Filed Nov. 2, 1932   2 Sheets-Sheet 1
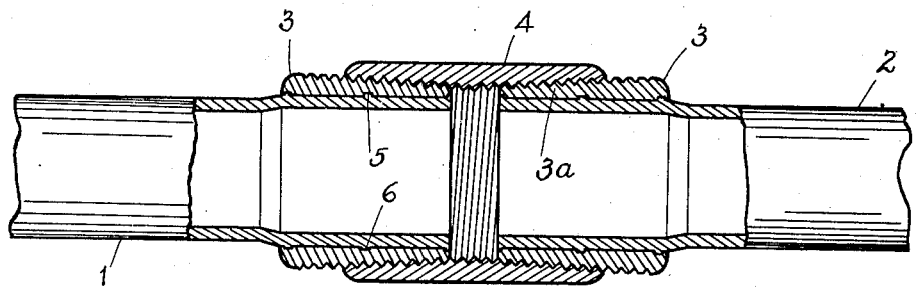
Fig. I
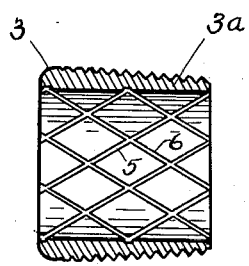
Fig. II
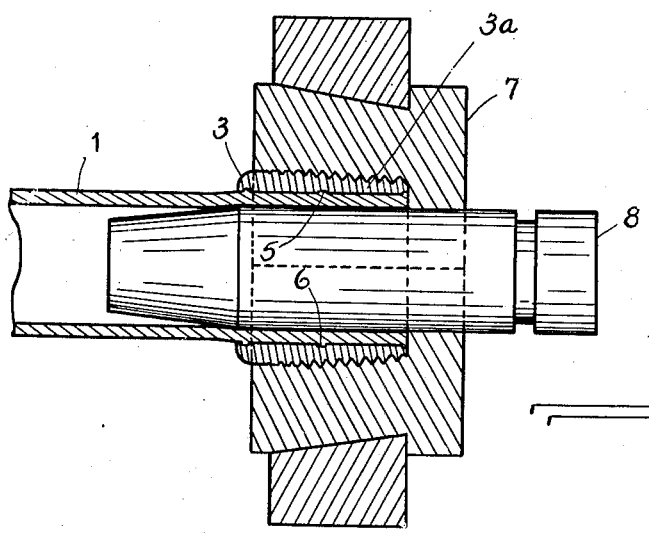
Fig. III
INVENTOR
Henry J. Wallace
by Christy Christy and Wharton
his attorneys April 3, 1934. H. J. WALLACE 1,953,665
PIPE CONNECTION
Filed Nov. 2, 1932   2 Sheets-Sheet 2
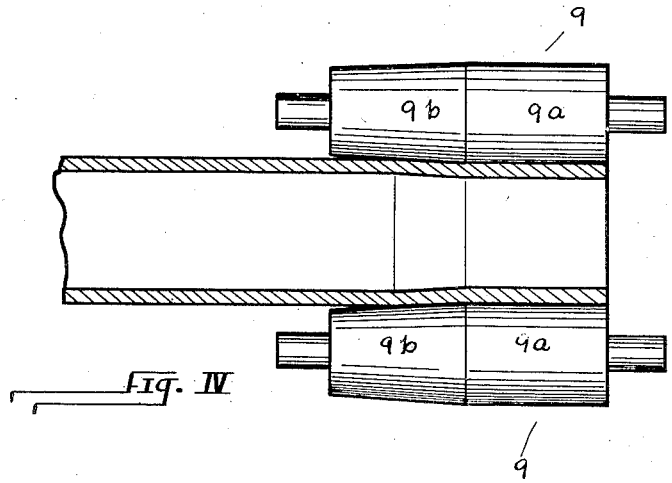
Fig. IV
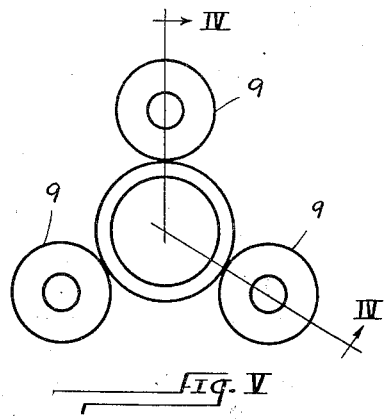
Fig. V
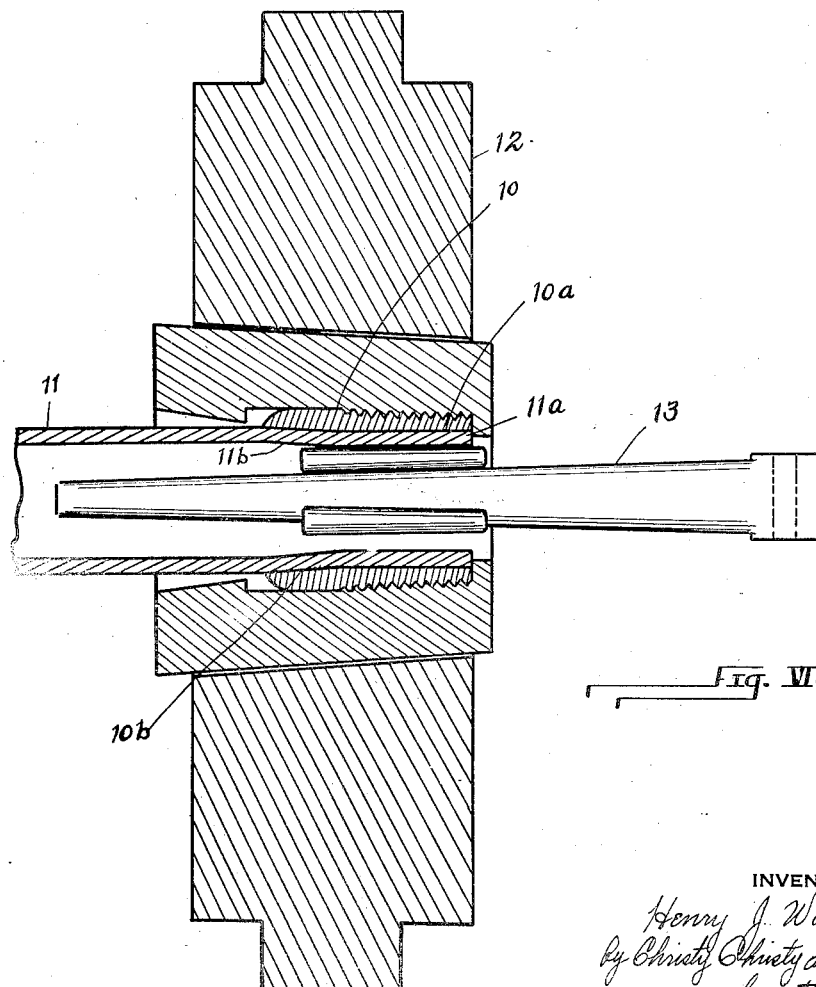
Fig. VI
INVENTOR
Henry J. Wallace
By Christy, Christy and Wharton
his attorneys Patented Apr. 3, 1934

1,953,665

UNITED STATES PATENT OFFICE 1,953,665

PIPE CONNECTION

Henry J. Wallace, Millvale, Pa.

Application November 2, 1932, Serial No. 640,808

2 Claims. (Cl. 285—146)

This invention relates to the terminal preparation of pipe for use with threaded couplings, valves, and fittings of usual form and standard sizes.

The terminal threading of pipe for the attachment of threaded couplings, valves, or fittings results in marked disadvantages in the use of the pipe. Pipe terminally so threaded is weakened in the threaded regions, to the extent that metal is cut away by threading. The threading, by providing channels for the collection of moisture, because the surface of the metal has been cut, and also for the preceding reason that in effect the wall thickness of the pipe has been lessened in the region of threading, results in pipe failure by corrosion in the threaded regions. Quite generally it is found that, when a pipe has failed, it is in the threaded terminal portion of the pipe at which adjacent lengths of pipe are coupled.

Because of the disadvantages attendant upon the threading of pipe, various expedients and devices, some of them relatively complicated or cumbersome, have been devised, in order to obviate the necessity for threading. For example, upset flanges have been terminally formed on pipes, so that adjacent lengths of pipe may be coupled by bolting. Various structures arranged to terminally grasp lengths of pipe, and to interconnect adjacent lengths, have also been used. While certain of these expedients have proven desirable for use with pipe of relatively large diameter, the increased expense of manufacturing and inconvenience in use has prevented any widespread adoption of such expedients for small diameter pipe—that is, for pipe sizes up to four inches. Such small pipe are, up to the present time, universally threaded for the attachment of couplings and fittings, it being considered by pipe manufacturers that the disadvantages attendant upon a terminal threading of the pipe are of lesser weight than the disadvantages attendant upon flanging the pipe, or the use of special coupling devices.

It should be further explained that the trade practice in manufacturing iron and steel pipe consists in arbitrarily sizing pipe, ranging in size from ⅛" to 12", so that the inside diameter of these standard sizes approximates the nominal listing of the size, and the wall thickness and outside diameters conform to an arbitrary trade listing, subject to certain tolerances. Each of these standard sizes of pipe is in turn threaded to an arbitrary standard called the Briggs, or American, standard pipe threads, and all couplings, valves and fittings designed for use with standard pipe are also necessarily threaded to the same Briggs or American standard.

An object of my invention resides in permanently attaching terminal thread rings on lengths of pipe, the attachment being made without threading the pipe itself, and the thread rings being of such wall thickness that they match exteriorly with couplings or fittings one pipe size larger than that of the pipe to which the thread rings are applied.

Certain special features of my invention reside in the manner of permanent attachment of the thread rings to the pipe, to prevent relative movement between a thread ring and a pipe on which it is mounted. Certain special features are also involved in the prevention of leakage at the region of thread ring attachment to welded pipe, and more particularly to butt-weld pipe, by the tendency of the welded seam in the pipe to open during the attachment of the thread ring.

In the accompanying drawings Figure I is a longitudinal sectional view taken through the terminal regions of two standard size pipes, showing the pipes interconnected by means of thread rings thereon and the use of a threaded coupling, the latter being of standard size and form; Figure II is a longitudinal sectional view through a thread ring, such as those shown in Figure I, illustrating a means provided interiorly of the thread ring for engagement with the pipe to which the thread ring is applied; Figure III is a longitudinal sectional view illustrating a simple manner of interconnecting a pipe terminal and thread ring; Figure IV is a diagrammatic view illustrating a special mode of treatment for welded pipe preparatory to the attachment of the thread ring; Figure V is an end elevation illustrating the terminal preparation of the pipe also illustrated in Figure IV; and Figure VI is a longitudinal section illustrating the attachment of a thread ring to a pipe terminal prepared for its reception in the manner shown in Figures IV and V.

Referring to Figure I of the drawings, two pipes 1 and 2 are shown as interconnected. It should be understood that these pipes 1 and 2 are of one of the smaller sizes noted, and for purposes of illustration, we may assume that they are three-quarter-inch pipe. These pipes may be seamless tube, or any one of the welded tubes. Each of the pipes 1 and 2 has secured terminally thereon a thread ring 3, which is of such wall thickness that its forward, or threaded, portion 3a corresponds to the standard threaded portion of a pipe one pipe-size larger than that to which the thread ring is attached. In the specific example of three-quarter-inch pipe taken, the thread ring thus provides a terminal corresponding to the terminal of a threaded pipe of one inch size. The standard threaded coupling 4 is a member of diameter and threading suitable for use with one-inch pipe terminally provided with standard threading.

Referring particularly to Figure II of the drawings, it will be seen that the thread rings 3 are prepared for use by cutting in their interior bore a plurality of intersecting square sided grooves 5 and 6, and it should be noted that in preparation for the attachment of a thread ring the pipe terminals are neither threaded nor otherwise weakened.

For attachment of the thread rings, as shown in Figure III of the drawings, a ring is threaded into an open die 7, and a pipe terminal is inserted within the thread ring in the die. As shown, the transverse bore wall in the die accurately lines up the edges of the thread ring and pipe.

With the assembly of die, thread ring, and pipe so made, an expanding tube or mandrel 8 is forced into the pipe to expand it into engagement with the thread ring. In this action, whether it be conducted hot or cold, the metal of the pipe is forced into the grooves 5 and 6 in the thread ring, so that the thread ring is definitely locked on the pipe terminal against longitudinal movement, or movement in either direction of rotation. This interengagement of the thread ring and pipe is effected without peening, or other relatively difficult operation. The metal of the pipe is conserved, and the pipe surface is not made discontinuous, as in threading.

It should be understood that this operation is a simple one, which is performed primarily at a pipe mill, and may be correlated with other steps of pipe manufacture. Taking a standard length of pipe, a thread ring is thus applied in the mill to both terminals of the length of pipe. It may, however, be performed in plumbing shops, or on the job, if it becomes necessary to cut a standard length of pipe, and to mount a thread ring at the severed terminal of the pipe. Because of the reinforcement provided by the thread ring, obtained without injury to the pipe terminal, the portion of the pipe which in ordinary threading practice is the weakest, and the primary region of pipe failure, is, by attachment of the thread ring, made the strongest and most enduring region of the pipe.

The above described simple procedure may be in all cases employed in applying thread rings to seamless tubing, and may in most instances be used with pipe of other types. As is well known, seamless tubing is accurately sized and rounded within the narrowest tolerances, and obviously contains no seam which might be strained by the action of forcing the metal of a pipe terminal into engagement with a thread ring. When welded pipe, and particularly butt-welded pipe, is to be subjected to relatively high pressures, it may be desirable to employ the procedure hereinafter described in order to prevent weakening of the pipe at the seam by the forcing of the pipe metal into locking engagement with a thread ring. This is for the reason that the pipe, in addition to the seam which it contains, is also sized and rounded within wider tolerances than are permitted in the case of seamless tubing.

In accordance with this special procedure, the terminal of the pipe is sized preliminary to attaching the thread ring. This sizing may be done by the ordinary method of forcing a die over the end of the pipe, or by subjecting the pipe terminally to a rolling operation, which accurately rounds the pipe terminally and reduces a region immediately adjacent its end to a size approximating the lowest permissible tolerance for the pipe size. As shown in Figures IV and V, rounding rolls 9 are used which have a cylindrical portion 9a to accurately round and size the pipe immediately adjacent its edge, and conical portions 9b which form an inclined shoulder on the pipe extending rearwardly from this accurately sized and rounded portion. This preparatory treatment may be effected by relatively light apparatus, suitable for attachment to a pipe-threading machine, or for use by hand, in a plumbing shop, or on the job where the pipe is to be put into use. The preparatory treatment may, therefore, be employed conveniently in preparing the blank terminal of a severed length of pipe for the attachment of a thread ring.

Figure VI of the drawings illustrates the attachment of a thread ring 10 to the terminal of a pipe 11 so prepared. In this instance also an open die 12, similar to the die 7, may be employed for the expansion of the pipe terminal into the thread ring.

It will be noted in Figure VI of the drawings that the forward portion 10a of the thread ring is cylindrical to correspond with the forward cylindrical portion 11a of the pipe. The rearward portion 10b of the thread ring increases progressively in diameter rearwardly, to provide a tapered bore corresponding to the tapered shoulder 11b of the pipe. In this form of thread ring the bore of the forward cylindrical portion 10a may be grooved in a manner similar to the grooving of the thread ring 3, and the bore of the rearward, tapered, portion 10b of the thread ring may be either independently grooved or left plain.

Because of accurate sizing and rounding of the extreme terminal portion of the pipe, it enters readily into a thread ring of predetermined size, and when expanded, as by use of the expanding mandrel 13, similar to an ordinary boiler tube expander, violent working of the pipe metal is not necessary in order to bring it into clinched engagement with the thread ring at all points. The region of tapered engagement between the pipe terminal and the thread ring also definitely prevents leakage at the rearward end of the connection, even though a tendency for the pipe weld to open may have been created by the expanding operation.

The most striking advantages of the invention have been previously noted. To restate these advantages, a pipe is produced in which the convenience of threaded pipe terminals are obtained, while strengthening, rather than weakening, the pipe in the terminal regions. Standard lengths of pipe may be fully equipped at the pipe mill, so that it is merely necessary to apply standard couplings and fittings in use. If it is necessary to cut a standard length of pipe, the severed terminal may be readily placed in the same condition as the preexisting terminal finished at the mill. An incidental advantage of my invention lies in the fact that it is susceptible, in quantity manufacture, to continuous methods involving the terminal cropping of the pipe, and the threading and attachment of the thread ring.

It should be understood that chiefly I apply my invention to pipe of the smaller sizes, defined above, in which the wall of the pipe is not of a thickness so great as to render a cold expanding operation difficult, and in which the pipe does not have a wall thickness so great as to render the threading of the pipe terminal itself of relatively slight importance. With small size pipe, the additional manufacturing cost of flanging, and the additional installation cost of flanged pipe, is of relatively greater importance than it is in the large pipe sizes.

A marked advantage of small pipe equipped in accordance with my invention lies in the fact that the sizing is standard, and that couplings and fittings of standard sizes usual with ordinary threaded pipe may be used, such couplings and fittings being merely one pipe size larger than the pipe itself. The use of specialized and unstandardized parts is thus avoided, while obtaining the desired strengthening of the pipe in a region of common pipe failure.

An additional advantage is that the invention may also be used with thin walled pipe, for which, because of the paucity of metal in the wall, threading has not been practical. In such case, though the pipe itself does not technically conform to the definition "standard", the use of the thread ring brings it up to a larger standard size of couplings and fittings.

I claim as my invention:

1. As an article of manufacture a pipe of metal highly resistant to deformation having an unthreaded unflanged terminal, a thread ring of larger size than the pipe terminal threaded exteriorly and having interiorly thereof shallow indentations for extrusion of the pipe metal thereinto, and permanent expanded attachment of the pipe terminal in the thread ring secured by extrusion of pipe metal into the shallow indentations of the thread ring, the expansion of the pipe terminal in the thread ring being approximately uniform throughout and the bore of the pipe terminal being substantially free of localized deformation.

2. As an article of manufacture a pipe of metal highly resistant to deformation having an unthreaded unflanged terminal, a thread ring of larger size than the pipe terminal threaded exteriorly and having interiorly thereof shallow grooves for extrusion of the pipe metal thereinto, and permanent expanded attachment of the pipe terminal in the thread ring secured by extrusion of pipe metal into the shallow grooves of the thread ring, the expansion of the pipe terminal in the thread ring being approximately uniform throughout and the bore of the pipe terminal being substantially free of localized deformation.

HENRY J. WALLACE.